T. B. THOMAS.
ANTISKIDDING DEVICE.
APPLICATION FILED FEB. 12, 1913.

1,078,322.

Patented Nov. 11, 1913.

Witnesses:
H. B. Davis.
C. Doyle.

Inventor:
Theodore B. Thomas
by Nays & Hanninan,
Attys.

UNITED STATES PATENT OFFICE.

THEODORE B. THOMAS, OF QUINCY, MASSACHUSETTS.

ANTISKIDDING DEVICE.

1,078,322.   Specification of Letters Patent.   Patented Nov. 11, 1913.

Application filed February 12, 1913. Serial No. 747,879.

*To all whom it may concern:*

Be it known that I, THEODORE B. THOMAS, a citizen of the United States, residing at Quincy, in the county of Norfolk and State of Massachusetts, have invented an Improvement in Antiskidding Devices, of which the following is a specification.

This invention relates to anti-skidding devices for automobiles and the like, involving the employment of a pair of ground-engaging devices arranged adjacent the traction-wheels. The ground-engaging devices each comprise a disk for engagement with the ground, and the invention has for its object the provision of strong and durable supports for the disks, of an improved form, as hereinafter described and claimed which admit of movement of the disks up and down while in engagement with the ground, and also a movement of the disks into and out of engagement with the ground, my improvements being directed mainly to greatly increasing the strength and durability of the supports.

Figure 1:
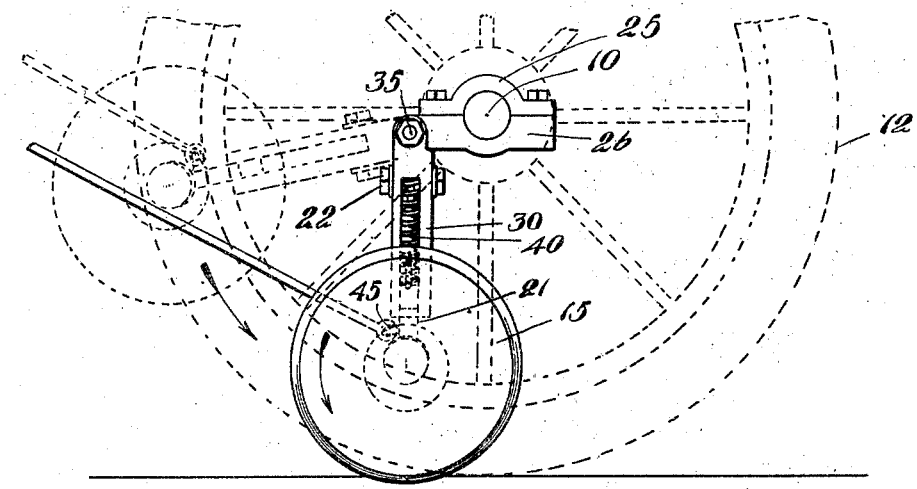
Figure 2:
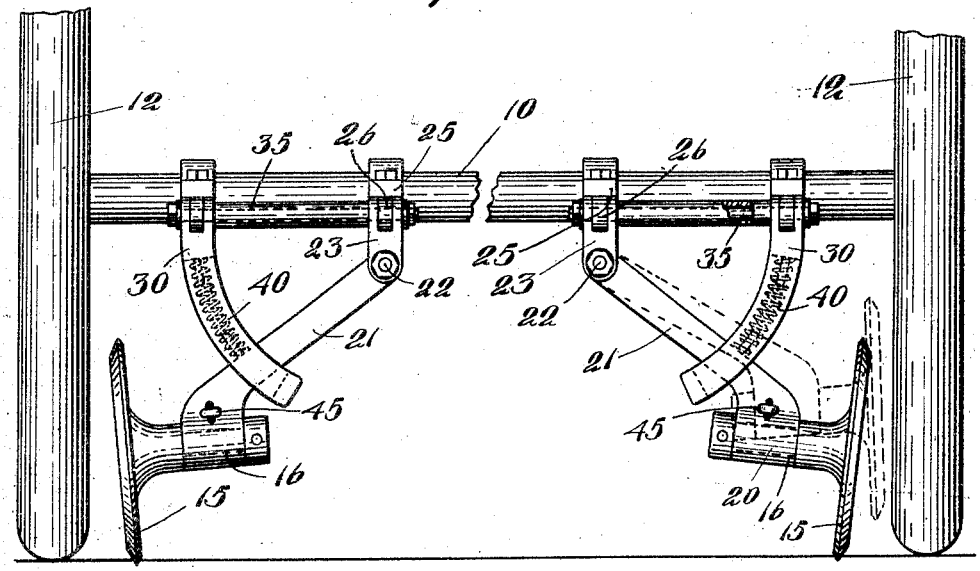
Figure 3:
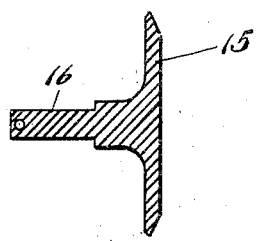

Figure 1 is a side elevation of one of the ground-engaging devices, it being represented in full lines in engagement with the ground and in dotted lines out of engagement with the ground. Fig. 2 is a front elevation of a pair of ground-engaging devices, and, Fig. 3 is a longitudinal vertical section of one of the disks and its axle.

For the purpose of illustration the support for the ground-engaging devices is represented at 10, and the traction-wheels at 12. The ground-engaging devices here shown are made substantially alike, although their relative positions with respect to the wheels are reversed, so that both are arranged at the inside of the wheels. A description of one will suffice.

15 represents a disk of any suitable construction having a stub-axle 16, preferably formed integral with it. The stub-axle extends through and has its bearing in the lower offset end portion 20 of a supporting-arm 21, and is held in place by a collar fixed to the end of the stub-axle. Said supporting arm 21 is pivoted at its upper end to a clevis 23, which is in turn pivotally connected to a clamp, which embraces the support 10. The pivots of the arm and of the clevis are arranged at right angles to each other, so that the arm has a movement up and down with respect to the ground and the clevis has a movement forward and backward. The clamp here shown is composed of two clamping-members 25 and 26 adapted to embrace the support 10, said members being bolted or otherwise secured together, yet any other form of clamp may be employed. The clevis is here shown as pivotally connected to the forward end of one of the clamping-members.

The supporting-arm 21 is guided in its vertical movements and is additionally supported by the guiding and supporting member, here shown as a slotted bar 30, pivotally connected at its upper end to another clamp arranged on the support 10. The supporting-arm is arranged in the slot of said member and is movable up and down therein. The pivotal connection of said bar 30 with its clamp is the same as the pivotal connection of the clevis with its clamp, hence said bar is movable forward and backward the same as the clevis, thereby permitting the supporting-arm to be moved forward and backward. For simplicity of construction the pivot-bolt 35 may extend through the forward extremities of both clamps and serve as the pivot for both the clevis and the slotted bar. In case the weight of the disk and supporting-arm bearing it are not sufficient to hold the disk in engagement with the ground a spring 40 may be placed in the slot of the bar 30, which engages the supporting-arm with a yielding pressure. The supporting-arm has an eye 45 or equivalent for connection with a rod by which the bar is moved forward and backward, thereby moving the disk into and out of engagement with the ground.

I claim:—

In an anti-skidding device, a ground-engaging device consisting of a disk having a stub-axle, a supporting-arm having an offset lower end-portion through which said stub-axle extends and which serves as a bearing therefor, a clevis to which the upper end of the supporting-arm is pivotally connected, a clamp to which said clevis is pivotally connected, a slotted guiding and supporting-member for said supporting-arm and a clamp to which the upper end of said member is pivotally connected, the pivotal connections of the clevis and slotted member with their clamps permitting forward and backward movement of the supporting-arm to move the disk out of and into engagement with the ground, substantially as described.

In testimony whereof, I have signed my name to this specification, in the presence of two subscribing witnesses.

THEODORE B. THOMAS.

Witnesses:
H. B. Davis,
B. J. Noyes.

Copies of this patent may be obtained for five cents each, by addressing the "Commissioner of Patents, Washington, D. C."